(12) United States Patent
McCarty

(10) Patent No.: US 10,657,017 B2
(45) Date of Patent: *May 19, 2020

(54) SYSTEMS AND METHODS TO SERVICE AN ELECTRONIC DEVICE

(71) Applicant: FedEx Supply Chain Logistics & Electronics, Inc., Fort Worth, TX (US)

(72) Inventor: Joel McCarty, Oklahoma City, OK (US)

(73) Assignee: FedEx Supply Chain Logistic & Electronics, Inc., Forth Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/998,994

(22) Filed: Aug. 20, 2018

(65) Prior Publication Data

US 2018/0373606 A1 Dec. 27, 2018

Related U.S. Application Data

(63) Continuation of application No. 15/222,579, filed on Jul. 28, 2016, now Pat. No. 10,083,102.

(51) Int. Cl.
| | |
|---|---|
| *G06F 11/00* | (2006.01) |
| *G06F 11/22* | (2006.01) |
| *G06F 11/263* | (2006.01) |
| *G06F 11/273* | (2006.01) |

(52) U.S. Cl.
CPC ...... *G06F 11/2294* (2013.01); *G06F 11/2289* (2013.01); *G06F 11/263* (2013.01); *G06F 11/273* (2013.01)

(58) Field of Classification Search
CPC ............... G06F 11/263; G06F 11/2635; G06F 11/3676; G06F 11/3688; G06F 11/3692
USPC ........................................................... 714/33
See application file for complete search history.

(56) References Cited

U.S. PATENT DOCUMENTS

| | | | |
|---|---|---|---|
| 2010/0005286 A1* | 1/2010 | Wang | G06F 9/4406 713/2 |
| 2012/0102462 A1* | 4/2012 | Kushneryk | G06F 11/3688 717/124 |
| 2013/0036402 A1* | 2/2013 | Mutisya | G06F 11/3688 717/124 |
| 2013/0212069 A1* | 8/2013 | Ponsford | G06F 11/1453 707/646 |

(Continued)

*Primary Examiner* — Sarai E Butler
(74) *Attorney, Agent, or Firm* — McGuireWoods LLP

(57) ABSTRACT

The disclosed embodiments include systems and methods to service an electronic device. In one embodiment, the method includes receiving a request to service an electronic device communicatively connected to a test station. The method also includes obtaining a device model and an image group of the electronic device and determining criteria to service the electronic device in accordance with a desired setup, where each image group is associated with one or more different device models. The method further includes transmitting a request to service the electronic device to a management system having an image of applications compatible with the image group of the electronic device. The method further includes receiving at least one of a virtual hard drive storing a copy of the image of the applications and an indication of a location of the virtual hard drive. The method further includes executing the applications to service the electronic device.

20 Claims, 7 Drawing Sheets

(56) References Cited

U.S. PATENT DOCUMENTS

| | | | | |
|---|---|---|---|---|
| 2014/0033188 A1* | 1/2014 | Beavers | ............... | G06F 8/65 717/170 |
| 2015/0269057 A1* | 9/2015 | Sofia | ............... | G06F 11/368 714/38.1 |
| 2015/0347282 A1* | 12/2015 | Wingfors | ........... | G06F 11/3688 717/125 |

* cited by examiner

SYSTEMS AND METHODS TO SERVICE AN ELECTRONIC DEVICE

CROSS-REFERENCE TO PRIOR APPLICATION

This is a continuation application of co-pending U.S. patent application Ser. No. 15/222,579, filed Jul. 28, 2016, the disclosure of which is incorporated by reference herein in its entirety.

BACKGROUND

The present disclosure relates generally to systems and methods to service an electronic device.

Quality control procedures for servicing an electronic device such as a smartphone, tablet, and PDA often include removing personal and proprietary content from the electronic device, re-configuring hardware, software, and/or firmware running on the electronic device, and/or installing new software and/or firmware on the electronic device. A procedure to service the electronic device may be based on the make and model of the electronic device, the physical condition of the electronic device, and one or more manufacturer, vendor, customer, and/or service technician specified criteria. Given that each of the foregoing requirements should be satisfied in order to successfully service the electronic device, manually servicing the electronic device may be error prone. Further, manually servicing multiple electronic devices would not only be error prone, but would also be proportionally more time consuming.

Some quality control procedures utilize a test station to automatically service the electronic device, thereby reducing technician error. However, different makes and device models of electronic devices may have conflicting setup procedures and may require different hardware components to configure the respective electronic devices. As such, it may be difficult for the test station to service multiple makes and device models of electronic devices in accordance with each respective electronic device's desired setup.

BRIEF SUMMARY OF THE DISCLOSED EMBODIMENTS

The disclosed embodiments provide systems and methods to service an electronic device. In accordance with one embodiment, a computer-implemented method to service an electronic device in provided. The method includes receiving a request to service a first electronic device communicatively connected to a first test station. The method further includes obtaining a device model and an image group of the first electronic device, where each image group is associated with one or more different device models. The method further includes determining criteria for servicing the first electronic device in accordance with a first desired setup, the criteria being based on the device model of the first electronic device. The method further includes transmitting a request to service the first electronic device to a management system having an image of one or more applications compatible with the image group of the first electronic device. The method further includes receiving at least one of a first virtual hard drive storing a copy of the image of the one or more applications and an indication of a location of the first virtual hard drive, the first virtual hard drive being accessible to the first test station. The method further includes executing a first set of the one or more applications to service the first electronic device in accordance with the first desired setup.

In accordance with another illustrative embodiment a system for servicing multiple electronic devices is provided. The system includes a plurality of test stations, each test station operable to service a plurality of electronic devices, each electronic device associated with an electronic device model (device model), and an image group that is associated with at least one device model. The system also includes a management system communicatively connected to the plurality of test stations. The management system is operable to receive a request from a first test station of the plurality of test stations, the first test station being communicatively connected to a first plurality of electronic devices. The management system is also operable to determine an image group of the first plurality of electronic devices. The management system is further operable to obtain a copy of an image of one or more applications operable to run on the first plurality of electronic devices, wherein the copy of the image is stored on a first virtual hard drive. The management system is further operable to transmit the first virtual hard drive storing the copy of the image of the one or more applications to the first test station, wherein a first set of the one or more applications are executed by the first test station to service the first plurality of electronic devices communicatively connected to the first test station.

In accordance with another illustrative embodiment, a non-transitory machine-readable medium including instructions stored therein, which when executed by one or more processors, causes the one or more processors to perform operations to service an electronic device is provided. The instructions include instructions to receive a request to service a first electronic device. The instructions also include instructions to provide an interface to display one or more device models of one or more image groups on a first test station communicatively connected to the first electronic device, where each image group is associated with one or more different device models. The instructions further include instructions to obtain a device model and an image group of the first electronic device. The instructions further include instructions to determine criteria for servicing the first electronic device in accordance with a first desired setup, wherein the criteria is based on at least one of the device model of the first electronic device, a condition of the first electronic device, at least one user specified criteria, and at least one customer specified criteria. The instructions further include instructions to transmit a request to service the first electronic device to a management system having an image of one or more applications compatible with the image group of the first electronic device. The instructions further include instructions to receive at least one of a first virtual hard drive storing a copy of the image of the one or more applications, the first virtual hard drive being accessible to the first test station and an indication of a location of the first virtual hard drive. The instructions further include instructions to execute a first set of the one or more applications to service the first electronic device in accordance with the first desired setup.

In accordance with another illustrative embodiment, a computer-implemented method to service an electronic device is provided. The method includes receiving a request to service a first electronic device. The method also includes providing an interface to display one or more device models of one or more image groups on a first test station communicatively connected to the first electronic device, where each image group is associated with one or more different device models. The method further includes obtaining a device model and an image group of the first electronic device. The method further includes determining criteria for servicing the first electronic device in accordance with a first desired setup, the criteria being based on the device model of the first electronic device. The method further includes transmitting a request to service the first electronic device to a management system having an image of one or more applications compatible with the image group of the first electronic device, the management system being operable to provide, over an iSCSI, a first virtual hard drive storing a copy of the image of the one or more applications to the first test station. The method further includes requesting the first test station to execute a first set of the one or more applications to service the first electronic device in accordance with the first desired setup.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing Figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

Figure 1A:
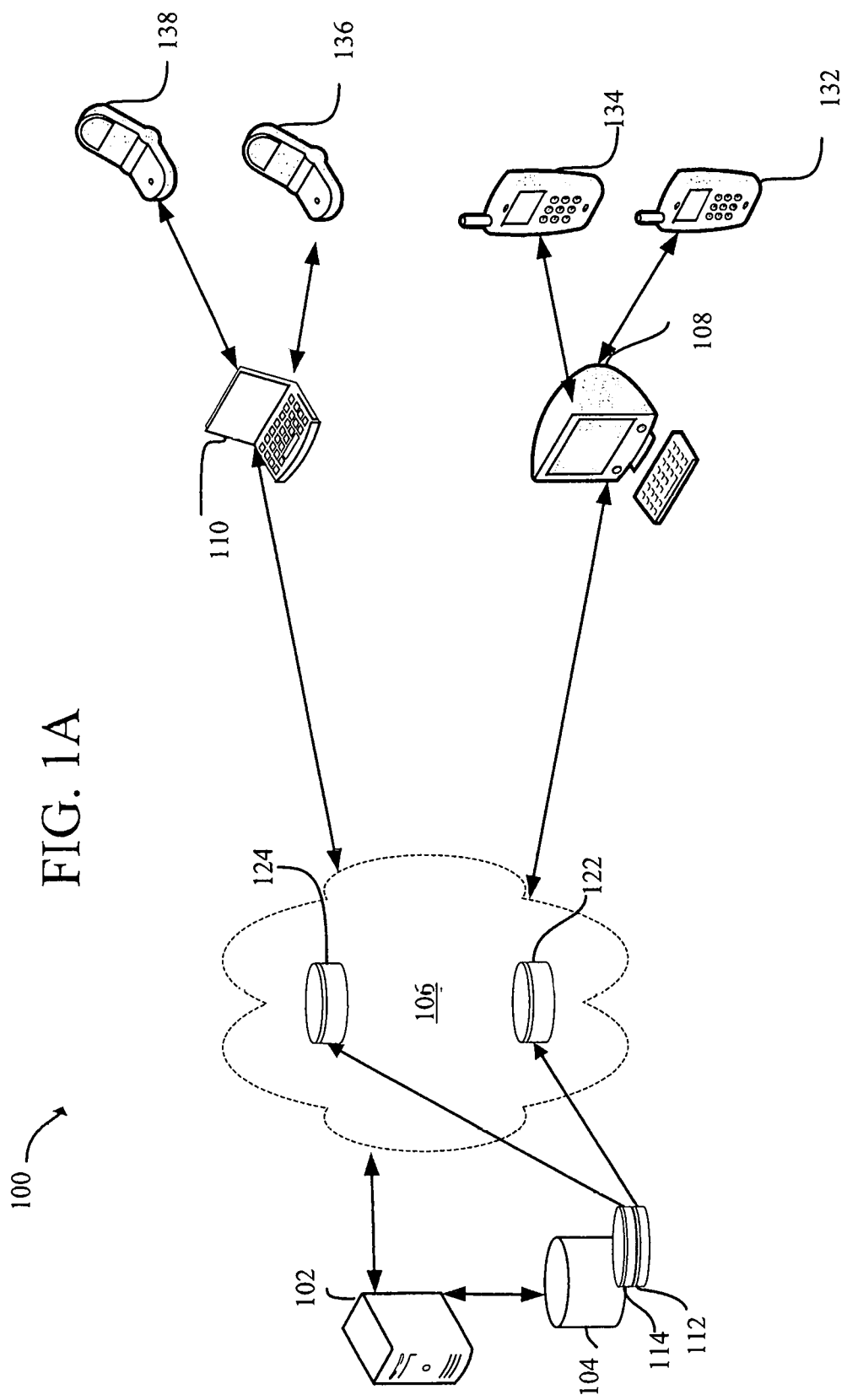
FIG. 1A is a network environment for servicing an electronic device in accordance with one embodiment.

FIG. 1A is a network environment 100 for servicing an electronic device in accordance with one embodiment. The network environment 100 includes a first test station 108 that is communicatively connected to a first electronic device 132 and a second electronic device 134. The first electronic device 132 and the second electronic device 134 may belong to an identical device model that is associated with a first image group or may belong to different device models that are associated with the first image group. The network environment 100 also includes a second test station 110 that is communicatively connected to a third electronic device 136 and a fourth electronic device 138. The third electronic device 136 and the fourth electronic device 138 may belong to an identical device model that is associated with a second image group or may belong to different device models that are associated with the second image group.

The first, second, third, and fourth electronic devices 132, 134, 136, and 138 include smartphones, tablet computers, electronic watches, PDAs, as well as similar devices having hardware, software, and/or firmware that may be configured by one of the first and second test stations 108 and 110. Each of the first, second, third, and fourth electronic devices 132, 134, 136, and 138 is associated with an image group and a device model of the respective image group. For example, the device model of the first electronic device 132 may be a sixth generation smartphone from a first manufacturer having a first display size, and the device model of the second electronic device 134 may be a sixth generation smartphone from the first manufacturer having a second display size. Further, the device model of the third electronic device 136 may be a fifth generation smartphone manufactured from a second manufacturer, and the device model of the fourth electronic device 138 may be a sixth generation smartphone manufactured from the second manufacturer. Further, the first image group may include all device models of a sixth generation of smartphones from the first manufacturer and the second image group may include all device models of fourth-seventh generations of smartphones from the second manufacturer.

As defined herein, an image group is associated with one or more device models that may be serviced by applications stored on a single image, such as first image 112 or second image 114. Continuing with the foregoing example, the first image 112 is an image of one or more applications compatible with different device models of electronic devices that are associated with the first image group (applications used to service a sixth generation of smartphones manufactured from the first manufacturer). Further, the second image 114 is an image of one or more applications compatible with different device models of electronic devices that are associated with the second image group (applications used to service fourth-seventh generations of smartphones manufactured from the second manufacturer). Further, a first copy of the first image 112 and a first copy of the second image 114 are stored on a first virtual hard drive 122 and a second virtual hard drive 124, respectively, and may be provided to the first and second test stations 108 and 110, respectively. The first test station 108 may access the first virtual hard drive 122 and run a first set of applications stored on the first virtual hard drive 122 to service a first device model associated with the first image group. The first test station 108 may also run a second set of applications stored on the first virtual hard drive 122 to service a second device model associated with the first image group. Moreover, the first test station 108 may access different sets of applications stored on the first virtual hard drive 122 to service different device models associated with the first image group. Additional descriptions of applications stored on the first and second images 112 and 114 as well as the first and second virtual hard drives 122 and 124 are provided in the paragraphs below.

The network environment 100 further includes a management system 102 that is communicatively connected to the first test station 108 and the second test station 110 via network 106. The management system 102 is also communicatively connected to a storage medium 104. The storage medium 104 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 104 includes multiple data storage devices. In further embodiments, the multiple data storage devices may be physically stored at different locations. The storage medium 104 includes the first image 112 and the second image 114. In other embodiments, the storage medium 104 may include a different number of images of applications for servicing the first, second, third, and fourth electronic devices 132, 134, 136, and 138 as well as other electronic devices (not shown) that are communicatively connected to the first and second test stations 108 and 110.

The management system 102 may be formed by one or more server computers, desktop computers, laptop computers, similar electronic devices, and the combination thereof that are operable to access the first image 112 and the second image 114, and to create the first virtual hard drive 122 and the second virtual hard drive 124. In some embodiments, the management system 102 is further operable to provide an indication of a location of the first virtual hard drive 122 and an indication of a location of the second virtual hard drive 124 to the first and second test stations 108 and 110. In other embodiments, the management system 102 is operable to provide the first virtual hard drive 122 and the second virtual hard drive 124 over the network 106 to the first test station 108 and the second test station 110, respectively.

In some embodiments, the management system 102 is further operable to modify one or more applications stored on the first image 112. In one of such embodiments, the management system 102 is also operable to create a third virtual hard drive (not shown) containing a copy of the updated first image 112, and further operable to provide at least one of the third virtual hard drive and a location of the third virtual hard drive to the first test station 108. In further embodiments, the management 102 is operable to create additional virtual hard drives (not shown) storing additional copies of the first image 112 or the second image 114 and is operable to provide the additional virtual hard drives to other test stations (not shown) that are communicatively connected to the network 106. Additional descriptions of the management system 102 are provided in the paragraphs below and are illustrated in at least FIG. 6.

The first test station 108 and the second test station 110 include hardware, software, and/or firmware components operable to service electronic devices communicatively connected to the respective test station 108 or 110 More particularly, the first test station 108 is operable to receive requests to service the first and/or second electronic device 132 or 134 and is operable to provide an interface to display a selection of one or more device models that are associated with one or more image groups on a display screen of the first test station 108. A technician may select the device model and the image group of the first electronic device 132 from the selection. The first test station 108 may also communicate with the first electronic device 132 to directly determine a device model and an image group associated with of the first electronic device 132.

The first test station 108 is further operable to transmit a request to the management system 102 to obtain applications for servicing the first electronic device 132. As stated herein, the management system 102, upon receipt of the request to service the first electronic device 132, provides at least one of the first virtual hard drive 122 and a location of the virtual hard drive 122 to the first test station 108. In some embodiments, the location of the first virtual hard drive 122 and the first virtual hard drive 122 are transmitted over an internet small computer systems interface (iSCSI) of the network 106.

Figure 3:
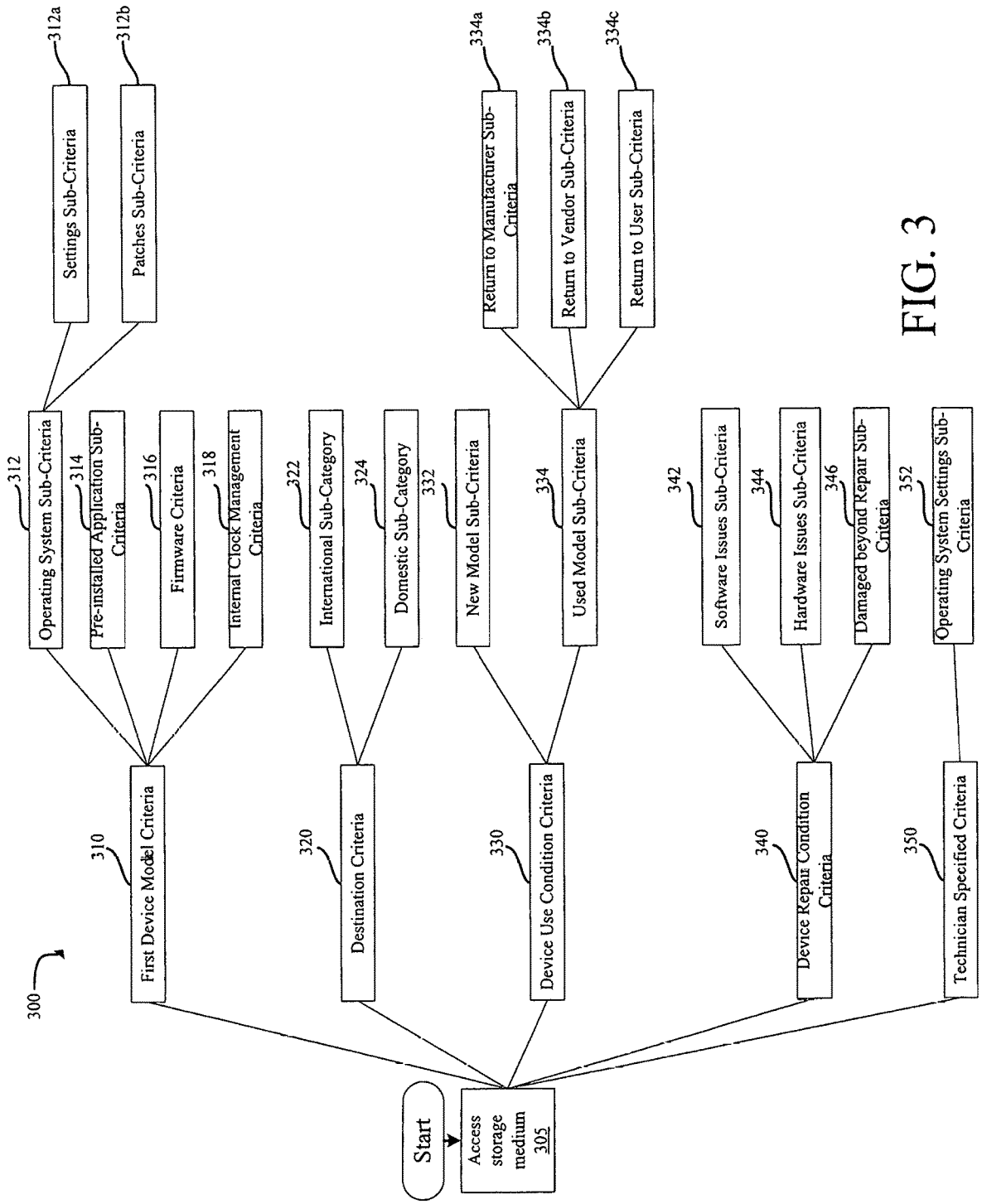
FIG. 3 is a tree diagram illustrating a process for determining criteria for servicing the first electronic device in accordance with a first desired setup in accordance with one embodiment.

In some embodiments, the first test station 108, upon receipt of the first virtual hard drive 122 or the location of the first virtual hard drive 122, determines a first desired setup of the first electronic device 132. As defined herein, a setup of an electronic device specifies which software and/or firmware should be installed or removed from the electronic device as well as hardware, software, and/or firmware configurations of the electronic device after the electronic device is successfully serviced. The setup also specifies whether to remove existing user and/or proprietary content from the electronic device. The first test station 108 determines criteria for servicing the first electronic device 132 in accordance with the first desired setup. Each desired setup includes one or more device specific, model specific, vender specific, condition specific criteria, and/or similar criteria for servicing an electronic device, such as the first electronic device 132. For example, criteria for servicing the first electronic device 132 in accordance with the first desired setup includes criteria based on the model of the first electronic device 132, criteria based on a destination of the first electronic device 132, criteria based on a device use condition of the first electronic device 132, and criteria based on a device repair condition of the first electronic device 132. Further, criteria for servicing the first electronic device 132 in accordance with the first desired setup also includes criteria based on technician, manufacturer, vendor, and/or owner specified instructions, as well as other criteria that should be satisfied in order to service the first electronic device 132 in accordance with the first desired setup. Different electronic devices may have different criteria for servicing the respective electronic device. Additional descriptions regarding how to determine the first desired setup of the first electronic device 132 as well as criteria for servicing other electronic devices in accordance with other desired setups are provided in the following paragraphs and are illustrated in FIG. 3.

The first test station 108 then executes one or more applications stored on the first virtual hard drive 122 to service the first electronic device 132 in accordance with the first desired setup. In one of such embodiments, the first virtual hard drive 122 contains applications for servicing every device model of the first image group. As such, the first test station 108 executes a first set of the one or more applications to service the first electronic device 132 in accordance with the first desired setup and executes a different set of the one or more applications to service another device belonging to a different device model of the same image group. For example, if the first electronic device 132 belongs to a first device model having a first screen size, then the first test station 108 would execute pixel density and screen resolution related applications stored on the first virtual hard drive 122 that are compatible with the first screen size to service the first electronic device 132. Similarly, if the second electronic device 134 belongs to a second device model having a second screen size, then the first test station 108 would execute pixel density and screen resolution related applications stored on the first virtual hard drive 122 that are compatible with the second screen size to service the second electronic device 134.

The first test station 108 also obtains the device model and image group of the second electronic device 134. In some embodiments, the first test station 108, upon receipt of at least one of the first virtual hard drive 122 or the location of the first virtual hard drive 122, determines whether the second electronic device 134 should also be serviced in accordance with the first desired setup. For example, if the first electronic device 132 and the second electronic device 134 both belong to the same device model, then the first test station 108 also executes the first set of the one or more applications stored on the first virtual hard drive 122 to service the second electronic device 134 in accordance with the first desired setup. Alternatively, if the first electronic device 132 and the second electronic device 134 belong to different device models, then the first test station 108 performs the processes described herein to determine a second desired setup for servicing the second electronic device 134, and executes a second set of applications stored on the first virtual hard drive 122 to service the second electronic device 134 in accordance with the second desired setup. The first test station 108 may be communicatively connected to additional electronic devices (not shown), and may be operable to determine a desired setup for each of the additional electronic devices and service each of the additional electronic devices in accordance with the desired setup of the respective electronic device.

The second test station 110 is communicatively connected to the third and fourth electronic devices 136 and 138 and is operable to perform the operations described in the foregoing paragraphs to service the third and the fourth electronic devices 136 and 138. Further, additional test stations (not shown) may also perform the foregoing processes to service electronic devices communicatively connected to the additional test stations. In one of such embodiments, a third test station (not shown) is communicatively connected to a fifth electronic device that is associated with the same image group as the first and second electronic devices 132 and 134. In such an embodiment, the third test station determines the device model and image group of the fifth electronic device, then transmits a request to service the fifth electronic device to the management system 102. The management system 102, upon receipt of the request, determines if the first virtual hard drive 122 is utilized by the first test station 108. The management system 102 then provides the third test station with the first virtual hard drive 122 or the location of the first virtual hard drive 122 if the first virtual hard drive 122 is not being accessed by the first test station 108. Alternatively, the management system 102 creates a third virtual hard drive which contains a second copy of the first image 112, and provides the third virtual hard drive or a location of the third virtual hard drive over the network 106 to the third test station.

In some embodiments, the management system 102 has access to a first set of virtual hard drives (not shown), where each virtual hard drive of the first set of virtual hard drives stores a copy of an first image 112. The management system 102 provides each virtual hard drive to a different test station that is communicatively connected to the management system 102 upon receipt of multiple requests to service multiple electronic devices communicatively connected to the multiple test stations. The first test station 108 may dynamically request the management system 102 to readjust the number of the first set of virtual hard drives based on the number of the first set of virtual hard drives relative to the number of test stations communicatively connected to the management system 10?

In one of such embodiments, the first test station 108 determines a number of test stations that are communicatively connected to the managing system 102 and are utilized to service at least one electronic device that is associated with the first image group (first group of test stations). The first test station 108 also determines the number of virtual hard drives that belong to the first set of virtual hard drives (virtual hard drives that store a copy of the first image 112). The first test station 108 then dynamically requests the management system 102 to readjust the number of virtual hard drives that store a copy of the first image 112 based on a first ratio of the number of test stations belonging to the first group of test stations relative to the number of virtual hard drives that store a copy of the first image 112. For example, the first test station 108 may request the management system 102 to delete at least one existing virtual hard drive that stores a copy of the first image 112 if the first ratio is less than one, which indicates the management system 102 has access to more virtual hard drives storing the first image 112 than to the number of test stations utilized to service electronic devices that are associated with the first image group. Alternatively, the first test station 108 may request the management system 102 to create a new virtual hard drive that stores a copy of the first image 112 if the first ratio is greater than one, which indicates that the management system 102 has access to less virtual hard drives storing the first image 112 than to the number of test stations utilized to service electronic devices that are associated with the first image group.

In some embodiments, the first test station 108 also requests the management system 102 to dynamically readjust the number of virtual hard drives that store a copy of the first image 112 to account for fluctuations to the number of test stations utilized to service electronic devices that are associated with the first image group within a future operational duration, such as within the next hour, day, week, or other increment of time. In one of such embodiments, the first test station 108 determines that five virtual hard drives, each storing a copy of the first image 112, are currently provided to five test stations to service electronic devices that are associated with the first image group. The first test station 108 further determines that at one time within the next day, a maximum of ten test stations would be concurrently utilized to service electronic devices that are associated with the first image group. The first test station 108 then determines that the number of virtual hard drives storing a copy of the first image will not be sufficient given the increase in the number of test stations to be concurrently utilized, and requests the management system 102 to create additional virtual hard drives to account for the increase in the total number of test stations to be concurrently utilized to service electronic devices that are associated with the first image group within the next week.

In another one of such embodiments, the first test station 108 predicts the maximum number of test stations to be concurrently utilized within the next week based on the maximum number of test stations previously utilized within a preceding operational duration, such as within the past hour, day, week, month, or another time increment. In one of such embodiments, the first test station 108 determines that at one time within the last week, fifteen test stations were concurrently utilized to service electronic devices that are associated with the first image group, and predicts that at one point in the next week, fifteen test stations would again be concurrently utilized to service electronic devices that are associated with the first image group. The first test station 108 then requests the management system 102 to create additional virtual hard drives in anticipation of the increase in the total number of test stations to be concurrently utilized to service electronic devices that are associated with the first image group within the next week.

In some embodiments, the first test station 108 also requests the management system 102 to dynamically readjust the number of virtual hard drives that store a copy of the first image 112 to account for fluctuations to the number of electronic devices scheduled to be serviced by test stations. In one of such embodiments, the first test station 108 determines how many electronic devices that are associated with the first image group may be serviced by the test stations and determines a maximum number of electronic devices that are associated with the first image group are scheduled to be concurrently serviced at one time within an operational duration. The first test station 108 then requests the management system 102 to readjust the number of test stations utilized to service electronic devices that are associated with the first image group based on the number of electronic devices scheduled to be concurrently serviced within the operational duration. For example, if the first test station 108 determines that ten test stations are presently utilized to concurrently service 100 electronic devices and are operable to service a maximum of 100 electronic devices, and that 200 electronic devices that are associated with the first image group are scheduled to be concurrently serviced at one time within the next day, then the first station 108 would request the management system 102 to create additional virtual hard drives that store a copy of the first image 112 in anticipation of an increase in the number of electronic devices scheduled to be concurrently serviced. The first test station 108 may also request the management system 102 to increase the number of test stations to be utilized to service electronic devices that are associated with the first image group in anticipation of the foregoing increase.

In one of such embodiments, the first test station 108 identifies another test station that is currently not utilized to service electronic devices that are associated with the first image group but is operable to service electronic devices that are associated with the first image group. The first test station 108 then requests the identified test station or requests the management system 102 to service or to schedule the identified test station to service one or more electronic devices that are associated with the first image group.

In another one of such embodiments, the first test station 108 may also determine a second ratio of the maximum number of electronic devices that are associated with the first image group and scheduled to be concurrently serviced relative to the maximum number of electronic devices the test stations are operable to concurrently service, and request the management system 102 to readjust the number of test stations utilized to service electronic devices that are associated with the first image group based on the second ratio. The first test station 108 then requests the management system 102 to reduce the number of test stations utilized to service electronic devices that are associated with the first image group if the second ratio is less than one and requests the management system 102 to increase the number of test stations utilized to service the electronic devices that are associated with the first image group if the second ratio is greater than one.

In some embodiments, the first test station 108 may also determine a number of test stations that are communicatively connected to the managing system 102 and are utilized to service at least one electronic device that is associated with a second image group (a second group of test stations). The first test station 108 also determines the number of virtual hard drives that belong to the second set of virtual hard drives (virtual hard drives that store a copy of the second image 114). The first test station 108 then dynamically requests the management system 102 to readjust the number of virtual hard drives that store a copy of the first image 112 based on the first ratio and also based on a third ratio of the number of test stations belonging to the second group of test stations relative to the number of virtual hard drives that store a copy of the second image 114. For example, if the value of the first ratio is less than one, then the management system 102 has access to more virtual hard drives that store a copy of the first image 112 than the number of test stations that are utilized to service electronic devices that are associated with the first image group. Similarly, if the value of the third ratio is less than one, then the management system 102 has access to more virtual hard drives that store a copy of the second image 114 than the number of test stations that are utilized to service electronic devices that are associated with the second image group.

The first ratio and the third ratio may also be compared with each other to determine a disparity between the number of virtual hard drives containing a copy of the first image 112 and the number of test stations that are utilized to service electronic devices that are associated with the first image group (first ratio) relative to the disparity between the number of virtual hard drives containing a copy of the second image 114 and the number of test stations that are concurrently utilized to service electronic devices that are associated with the second image group (third ratio). For example, if ten test stations are utilized to service electronic devices that are associated with the first image group and the management system 102 has access to twenty virtual hard drives, each storing a copy of the first image 112, then ten virtual hard drives are not being utilized, and the first ratio has a value of 0.5. Further, if ten test stations are also utilized to service electronic devices that are associated with the second image group, and the management system 102 has access to thirty virtual hard drives, each storing a copy of the second image 114, then twenty virtual hard drives are not being utilized, and the second ratio has a value of approximately 0.33.

The first test station 108 may then determine that one or more virtual hard drives containing a copy of the second image 114 may be less likely utilized relative to virtual hard drives containing a copy of the first image 112. The first test station 108 may then request the management system 102 to prioritize deleting one or more virtual hard drives that store a copy of the second image 114 over deleting one or more virtual hard drives that store a copy of the first image 112. The first station 108 may also perform a combination of the foregoing processes to request the system manager 102 to delete existing virtual hard drives and to create new virtual hard drives, and to manage fluctuations of the number of electronic devices scheduled to be concurrently serviced by one or more of the testing stations communicatively connected to the system manager 102.

In another one of such embodiments, the first test station 108 may request the management system 102 to provide the third virtual hard drive to the first test station 108 at or approximate the scheduled time to service the fifth electronic device. Additional descriptions of various operations of the first test station 108 and the second test station 110 are provided in the paragraphs below and are illustrated in FIGS. 2-5.

The network 106 can include, for example, any one or more of a cellular network, a satellite network, a personal area network (PAN), a local area network (LAN), a wide area network (WAN), a broadband network (BBN), the Internet, and the like. Further, the network 106 can include, but is not limited to, any one or more of the following network topologies, including a bus network, a star network, a ring network, a mesh network, a star-bus network, tree or hierarchical network, or similar network architecture. The network 106 may be implemented using different protocols of the internet protocol suite such as TCP/IP. The network 106 includes one or more interfaces for data transfer. In some embodiments, the first and second virtual hard drives 122 and 124 are transmitted over the network 106 via an Internet Small Computer Systems Interface (iSCSI) to first and second test stations 108 and 110, respectively. In some embodiments, the network 106 includes a wired or wireless networking device (not shown) operable to facilitate communication between the management system 102, the first and second test stations 108 and 110, and the electronic devices 132, 134, 136, and 138. Examples of the networking device include, but are not limited to, wired and wireless routers, wired and wireless modems, access points, as well as other types of suitable networking devices described herein. Although FIG. 1A illustrates a single management system 102 that is communicatively connected to the first and second test stations 108 and 110 via the network 106, additional management systems (not shown) and additional test stations (not shown) may also be communicatively connected to the management system 102 via the network 106.

Figure 1B:
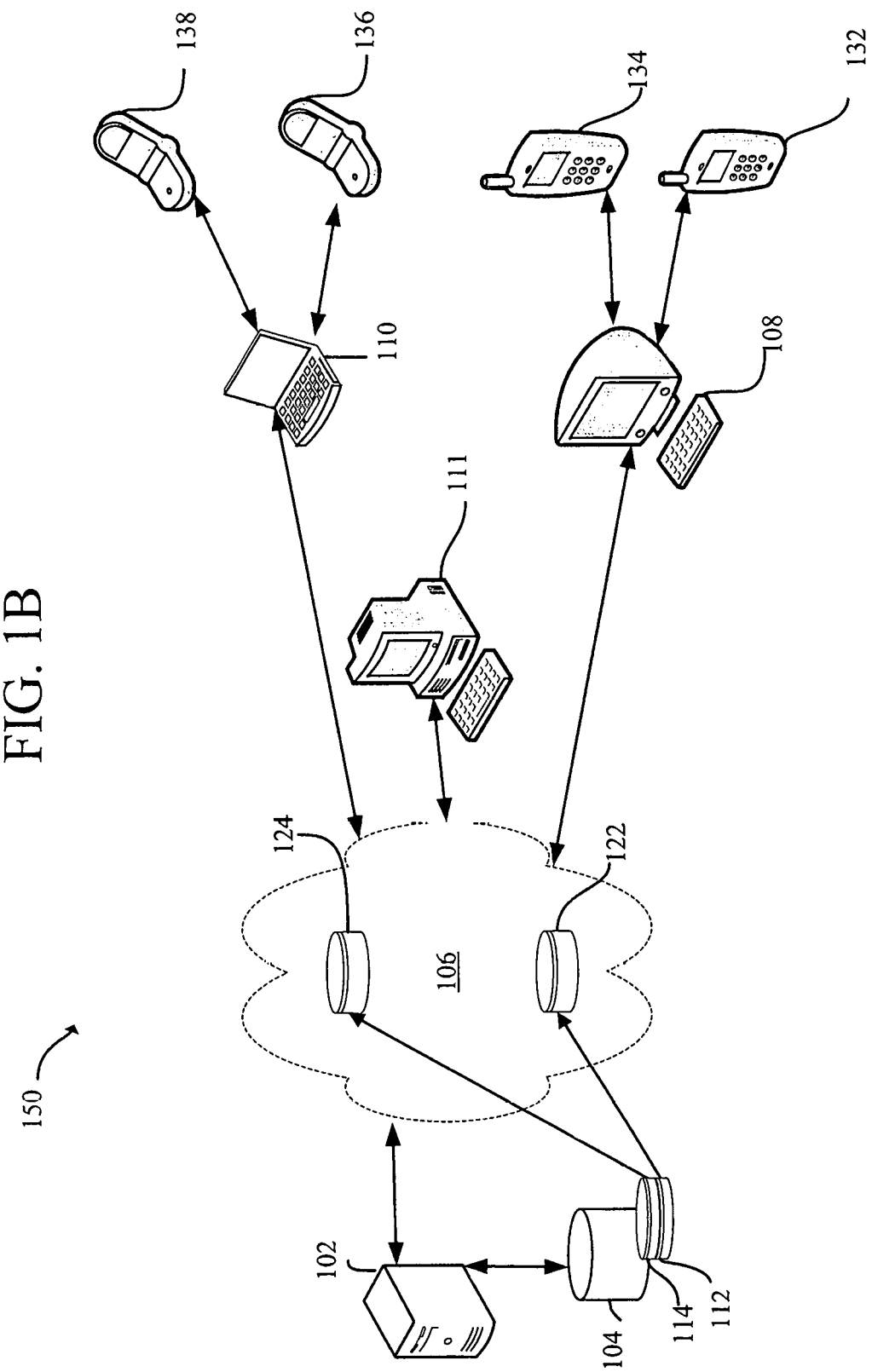
FIG. 1B is a network environment for servicing an electronic device in accordance with another embodiment.

FIG. 1B is a network environment 150 for servicing an electronic device in accordance with another embodiment. A control station 111 is communicatively connected to the management system 102, the first test station 108, and the second test station 110 via the network 106. A technician may operate the control station 111 to manage each test station communicatively connected to the control station 111 to service electronic devices communicatively connected to the respective test station. The control station 111, similar to the first test station 108 of FIG. 1A, receives a request to service the first electronic device 132, determines that the first electronic device 132 is communicatively connected to the first test station 108, and provides an interface to display a selection of one or more device models of one or more image groups the first test station 108 is operable to service on a display screen of the control station 111. Similarly, the control station 111 may receive a request to service the fourth electronic device 138, determine that the fourth electronic device 138 is communicatively connected to the second test station 110, and provide an interface to display a selection of one or more device models of one or more image groups the second test station 110 is operable to service on the display screen of the control station 111. In some embodiments, the technician may separately select the device model and the image group of the first electronic device 132 and the fourth electronic device 138 from the selections. The control station 111 may also communicate with the first electronic device 132 and the fourth electronic device 138, respectively, or with the first test station 108 and second test station 110, respectively, to determine device model and an image group of the first electronic device 132 and the fourth electronic device 138, respectively.

The control station 111 is further operable to transmit a request to service the first electronic device 132 to the management system 102. As stated herein, the management system 102 has access to the first image 112 of applications for servicing the first image group and is operable to create the first virtual hard drive 122 containing the first copy of the first image 112. Similarly, the management system 102 also has access to the second image 114 of applications for servicing the second image group and is operable to create the second virtual hard drive 124 containing the first copy of the second image 114. The control station 111 is operable to request the management system 102 to provide the first virtual hard drive 122 to the first test station 108. In some embodiments, the management system 102, upon receipt of the foregoing request, transmits a location of the first virtual hard drive 122 to the first test station 108 and a location of the second virtual hard drive 124 to the second test station 110. In further embodiments, the management system 102 transmits the first virtual hard drive 122 and the second virtual hard drive 124 to the first test station 108 and the second test station 110, respectively. In further embodiments, the management system 102 transmits both the first virtual hard drive 122 and the location of the first virtual hard drive 122 to the first test station 108, and transmits both the second virtual hard drive 124 and the location of the second virtual hard drive 124 to the second test station 110. The control station 111 then requests the first test station 108 and the second test station 110 to execute one or more applications stored on the first virtual hard drive 122 and the second virtual hard drive 124, respectively, to service the first electronic device 132 and the fourth electronic device 138.

The technician may utilize the control station 111 to service additional electronic devices. For example, the foregoing processes may be performed by the control station 111, management system 102, first test station 108, and second test station 110 to service the second electronic device 134 and the third electronic device 136, or other electronic devices (not shown) that are communicatively connected to the first test station 108, the second test station 110, or another test station (not shown). In some embodiments, the first electronic device 132 and the second electronic device 134 may be simultaneously serviced via the first test station 108. In that regard, the technician may utilize the control station 111 to request the first test station 108 to simultaneously service the first electronic device 132, the second electronic device 134, as well as one or more additional electronic devices (not shown) that are communicatively connected to the first test station 108. Although the following paragraphs and FIGS. 2-5 describe and illustrate additional operations performed by the first test station 108, these operations may also be performed by the control station 111 to service electronic devices communicatively connected to the first and second test stations 108 and 110. As such, the control station 111 not only allows the first test station 108 to devote available resources to running applications stored on the first virtual hard drive 122 to set up multiple electronic devices that are communicatively connected to the first test station 108, the control station 111 also allows the technician to conveniently and remotely service the multiple electronic devices.

Figure 2:
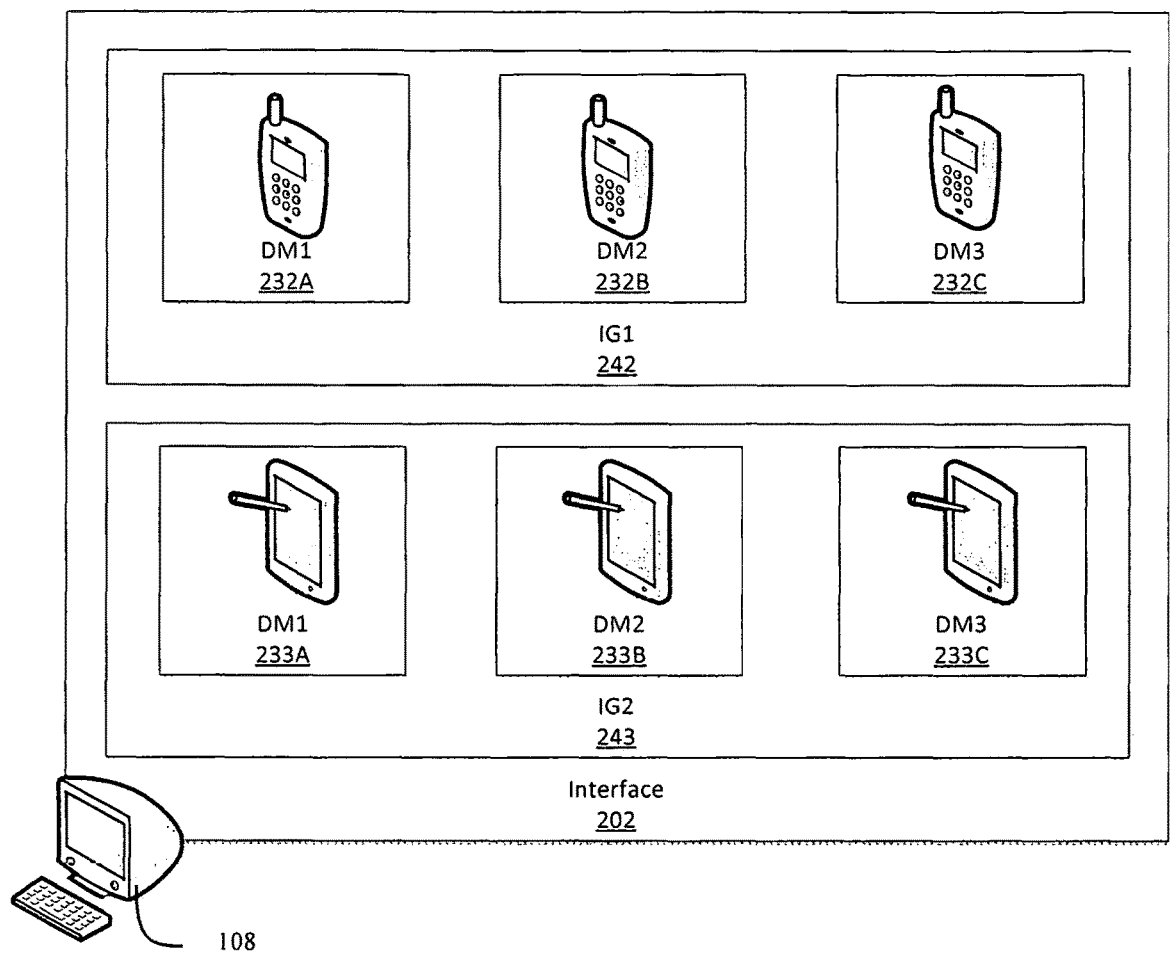
FIG. 2 is a schematic view of a first interface displaying a selection of device models and image groups that may be serviced by a first test station of FIGS. 1A and 1B in accordance with one embodiment.

FIG. 2 is a schematic view of a first interface 202 displaying a selection of device models 232A-232C and 233A-233C, and image groups 242 and 243 that may be serviced by the first test station 108 of FIGS. 1A and 1B in accordance with one embodiment. The first test station 108, upon receipt of a request to service the first electronic device 132, provides the first interface 202 on a display screen of the first test station 108. A selection of device models 232A-232C and 233A-233C and image groups 242 and 243 are displayed on the first interface 202. The technician may select from the first, second, and third device models 232A-232C of a first image group 242 and the first, second, and third device models 233A-233C of a second image group 243 that the first test station 108 is operable to service. In some embodiments, additional device models (not shown) that are associated with the first and second image groups 242 and 243 or are associated with other image groups (not shown) may be displayed on the first interface 202. The technician may select, from the displayed selection, the device model and the image group of the first electronic device 132. In other embodiments, the first interface 202 provides a list of device models and image groups that the first test station 108 is operable to service. In further embodiments, the first interface 202 provides one or more textual, visual, audio-visual, or similar types of content to indicate the device models and image groups that the first test station 108 is operable to service. In further embodiments, the first interface 202 may provide the technician with an input box to input the device model and image group of the first electronic device 132.

In some embodiments, the first electronic device 132 may provide the first test station 108 an indication of the device model and the image group from the first electronic device 132. In one of such embodiments, the first test station 108 compares the received indication of the device model and image group of the first electronic device 132 with the user selected device model and image group of the first electronic device 132. The first test station 108 then generates an error message and provides the error message for display on the first interface 202 if the user selection of the device model and image group of the first electronic device 132 does not match the indication of the device model and image group of the first electronic device 132. Once the first test station 108 determines the device model and the image group of the first electronic device 132, the first test station 108 transmits a request to service the first electronic device 132 to the management system 102 and receives at least one of a virtual hard drive such as the first virtual hard drive 122 and a location of the first virtual hard drive 122 from the management system 102.

FIG. 3 is a tree diagram 300 illustrating a process for determining criteria for servicing the first electronic device 132 to a first setup in accordance with one embodiment. Although the paragraphs below describe the operations of the process 300 being performed by a processor of the first test station 108, the process may also be performed by a processor of the control station 111, by the second test station 110, or by another test station (not shown). Further, although operations in the process 300 are shown in a particular sequence, certain operations may be performed in different sequences or at the same time where feasible. Further, in some embodiments, different combinations of some or all of the steps of the process 300 are performed to determine the desired setup of another electronic device.

Each desired setup includes instructions specifying criteria for servicing an electronic device to the respective desired setup as well as instructions specifying which application should be installed on the electronic device, how to configure hardware, software, and/or firmware settings, how to manage existing user and/or proprietary content, as well as other instructions for servicing the electronic device in accordance with the respective desired setup. In some embodiments, the instructions are stored on a local storage medium that is accessible by the first test station 108. In other embodiments, the instructions are stored on the storage medium 104 and are accessible over the network 106. At step 305, a processor of the first station 108 accesses the storage medium to obtain instructions for the first desired setup.

At step 310, the processor accesses instructions to determine criteria for servicing the first electronic device 132. Criteria for servicing the first electronic device 132 are further divided into multiple sub-criteria to provide more granular categorization of the first desired setup. At step 312, the processor determines the sub-criteria for updating the operating system of the first electronic device 132. The sub-criteria for updating the operating system of the first electronic device 132 is further divided into additional sub-criteria to provide even more granular categorization of the first desired setup. At step 312a, the processor determines the sub-criteria for updating the settings of the operating system 312a, which specifies default brightness, language, time zone, font size, volume as well as other default settings of the operating system. At step 312b, the first electronic device 132 determines the sub-criteria for installing one or more patches to update the operating system.

At step 314, the processor determines sub-criteria for pre-installed applications. In some embodiments, the foregoing sub-criteria specify which applications should be pre-installed on the first electronic device 132. Examples of pre-installed applications include word processing applications, anti-virus applications, web browsing applications, as well as other applications that may be pre-installed together with the operating system. At step 316, the processor determines the sub-criteria for updating firmware. In some embodiments the foregoing criteria specifies how to update one or more firmware applications running on the first electronic device. At step 318, the processor determines the sub-criteria for clock management to determine how to manage internal clocks of the first electronic device 132.

At step 320, the processor determines criteria for servicing the first electronic device 132 based on a destination of the first electronic device 132. The destinations criteria include international destination and domestic destination sub-criteria. At step 322, the processor determines sub-criteria for servicing the first electronic device 132 if the first electronic device 132 is scheduled to be delivered to an international destination. The foregoing sub-criteria specify a default language of the operating system running on the first electronic device 132, a default time zone, as well as which proprietary applications may be installed on the first electronic device 132. At step 324, the processor determines the sub-criteria for servicing the first electronic device 132 if the first electronic device 132 is scheduled to be delivered to a domestic destination. The foregoing sub-criteria specify a default time zone as well as default settings for location based domestic services.

At step 330, the processor determines criteria for servicing the first electronic device 132 based on whether the first electronic device 132 is new, or used (device use criteria). The device use criteria include sub-criteria for new device models and pre-owned device models. At step 332, the processor determines the sub-criteria for servicing new models, which includes determining which software should be installed on the first electronic device 132 as well as hardware, software, and/or firmware settings for the first electronic device 132. At step 334, the processor determines the sub-criteria for servicing pre-owned models. The sub-criteria for servicing pre-owned models are further divided into sub-criteria for servicing electronic devices designated for return to manufacturer, return to vendor, and return to user.

At step 334A, the processor determines the sub-criteria for returning the first electronic device 132 to the manufacturer. The return to manufacturer sub-criteria may specify that all user and proprietary content as well as any user installed software applications should be removed. At step 334B, the processor determines the sub-criteria for the returning the first electronic device 132 to vendor. The return to vendor sub-criteria may also specify that of all user and proprietary content as well as any user installed software applications should be removed. The return to vendor sub-criteria may also specify one or more vendor specific applications to be installed on the first electronic device 132. At step 334C, the processor determines the sub-criteria for returning the first electronic device 132 to the user. The return to user sub-criteria may specify that existing user and proprietary content as well as user installed software should remain on the first electronic device 132.

At step 340, the processor determines criteria for servicing the first electronic device 132 based a type of repair scheduled for the first electronic device 132 (device repair condition). The foregoing criteria include sub-criteria specifying how to service devices having software related issues, devices having hardware related issues, as well as devices that are beyond repair. At step 342, the processor determines the criteria for servicing the first electronic device 132 if the first electronic device 132 is designated to have software related issues. The software related issues criteria may specify that the first test station 132 should install one or more diagnostic applications to facilitate software repair. At step 344 the processor determines the criteria for servicing the first electronic device 132 if the first electronic device. 132 is designated to have hardware related issues. The hardware related issues criteria may specify that one or more hardware configuration applications should be installed to facilitate hardware repair. At step 346, the processor determines if the first electronic device 132 is determined to be damaged beyond repair. The damaged beyond repair criteria may specify that all user content and proprietary content should be removed from the first electronic device 132, and specify that existing settings and software do not need to be modified.

At step 350, the processor determines criteria for servicing the first electronic device 132 based on technician specified instructions. The technician specific criteria include sub-criteria of technician specified settings. At step 352, the processor determines the sub-criteria for technician specified settings of the operating system 352, which specifies default brightness, language, time zone, font size, volume as well as other technician specified settings of the operating system.

In some embodiments, different criteria for servicing the first electronic device 132 may conflict. In one of such embodiments, some criteria for servicing the first electronic device 132 may be adjusted in view of other criteria for servicing the first electronic device 132. In another one of such embodiments, the first test station 108 prioritizes criteria based on the source of the criteria. For example, criteria to service the first electronic device 132 based on the device model and image group of the first electronic device 132 are given the highest priority, followed by technician specified criteria, followed by use condition criteria, followed by repair condition criteria, and followed by destination criteria. In a further one of such embodiments, the first test station 108 generates an error message if different criteria to service the first electronic device 132 conflict.

The process 300 is repeated for each electronic device being serviced by the first test station 108 as well as other electronic devices being serviced by other test stations communicatively connected to the network 106. In some embodiments, the processor may simultaneously perform the process 300 on multiple electronic devices.

Figure 4:
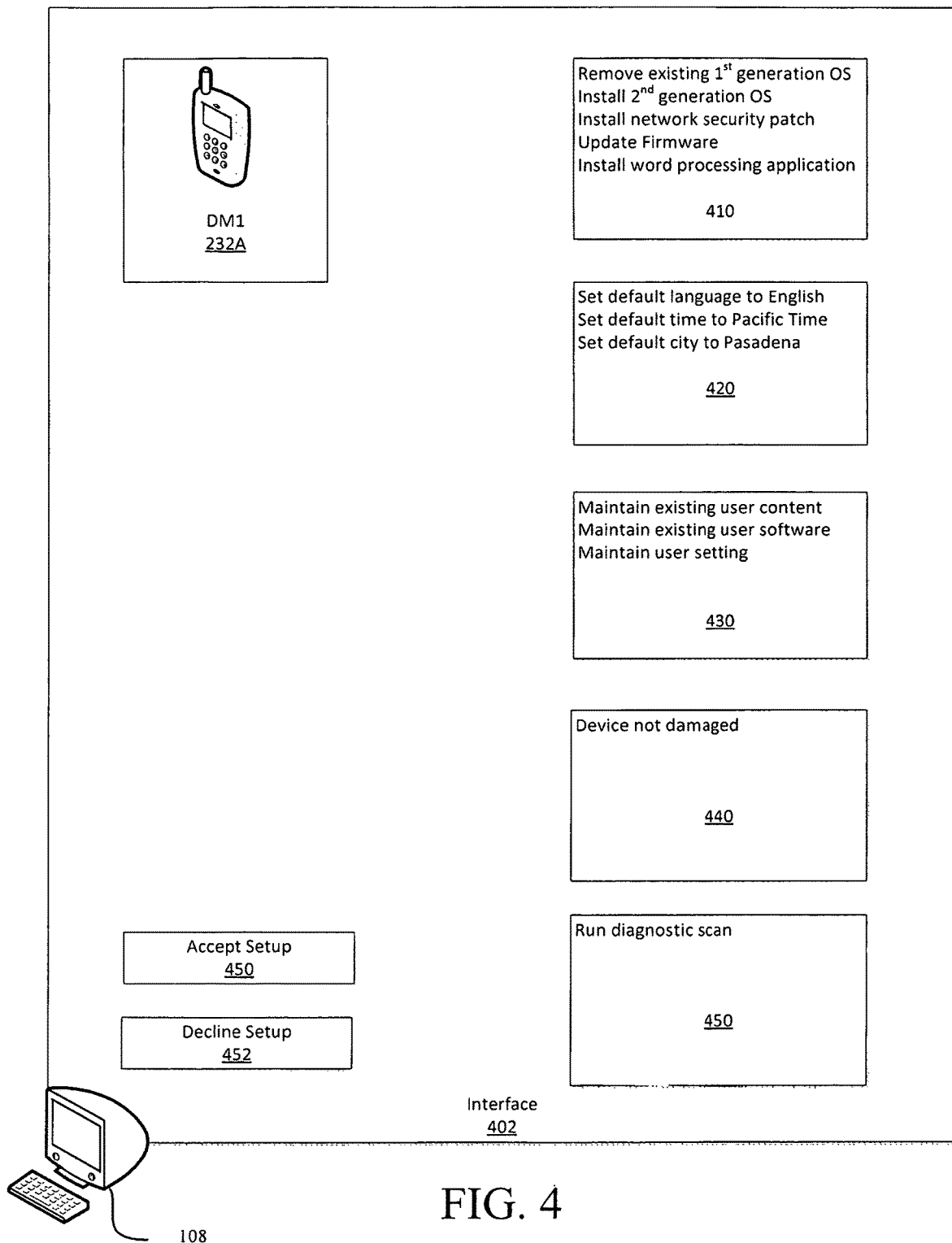
FIG. 4 is a schematic view of a second interface displaying criteria for servicing the first electronic device of FIGS. 1A and 1B in accordance with the first desired setup on the display screen of the first test station in accordance with one embodiment.

FIG. 4 is a schematic view of a second interface 402 displaying criteria for servicing the first electronic device 132 of FIGS. 1A and 1B in accordance with the first desired setup on the display screen of the first test station 108 in accordance with one embodiment. Moreover, criteria for servicing the first electronic device 132 in accordance with the first desired setup are provided for display in first-fifth interactive displays 410, 420, 430, 440, and 450 of the second display interface 402. The first interactive display 410 includes criteria for servicing the first electronic device 132 based on the device model of the first electronic device 132 as determined by steps 310, 312, 312b, 314, and 316 of the process 300. More particularly, the criteria for servicing the first electronic device 132 based on the device model of the first electronic device 132 include removing an existing $1^{st}$ generation operating system, installing a $2^{nd}$ generation operating system, installing a network security patch, updating firmware, and installing a word processing application on the first electronic device 132.

The second interactive display 420 includes criteria for servicing the first electronic device 132 based on the device destination of the first electronic device 132 as determined by steps 320 and 324 of the process 300. More particularly, the criteria for servicing the first electronic device 132 based on the device destination of the first electronic device 132 include setting the default language to English, setting the default time to Pacific Time, and setting default the city to Pasadena.

The third interactive display 430 includes criteria for servicing the first electronic device 132 based on the device use condition of the first electronic device 132, as determined in steps, 330, 334, and 334C of the process 300. More particularly, the criteria for servicing the first electronic device 132 based on the device use condition of the first electronic device 132 includes maintaining existing user content, maintaining existing user software, and maintaining existing user settings.

The fourth interactive display 440 includes criteria for servicing the first electronic device 132 based on the device repair condition of the first electronic device 132. The first electronic device 132 is determined not to require repair. The fifth interactive display 450 includes criteria for technician specified instructions, as determined in step 352. The technician requested the first test station 108 to run a diagnostic scan on the first electronic device 132.

The criteria illustrated in FIG. 4 for is specific to the first electronic device 132. The criteria for other electronic devices that are associated with different device models, having different destinations, or having different physical conditions would be different from the criteria illustrated in FIG. 4. In some embodiments, the instructions to service the first electronic device 132 in accordance with the first desired setup are stored on a local storage medium accessible to the first test station 108. In other embodiments, the instructions are stored on the storage medium 104 and are accessible to the first test station 108 via the network 106.

In some embodiments, the technician may decide whether to accept the criteria for servicing the first electronic device 132 as provided on the second interface 402. In that regard, the technician may accept the criteria by selecting selectable tab 450 or may decline the criteria by selecting selectable tab 452. In some embodiments, the technician may modify the criteria by selecting and/or deselecting one or more selections displayed on the first-fifth interactive displays 410, 420, 430, 440, and 450. In one of such embodiments, the technician may also input additional technician specified criteria for servicing the first electronic device 132 via the second interface 402. The first test station 108 then services the first electronic device 132 in accordance with the first desired setup upon receipt of an indication that the technician has accepted the displayed criteria. The first test station 108 then executes a first set of applications stored on the first virtual hard drive 122 to service the first electronic device 132 in accordance with the first desired setup. In some embodiments, the first test station 108 does not provide the second interface 402 for display. In one of such embodiments, the first test station 108, upon determining the first desired setup, automatically executes the first set of applications stored on the first virtual hard drive to service the first electronic device in accordance with the first desired setup.

In some embodiments, the first test station 108 also receives a request to service the second electronic device 134. The first test station 108 obtains the device model and image group of the second electronic device 134. As stated herein, the first and second electronic devices 132 and 134 are associated with one image group but belong to different device models. In one of such embodiments, the first test station 108 performs the foregoing process 300 as described in the previous paragraphs and illustrated in FIG. 3, or a similar process to determine criteria for servicing the second electronic device 134 in accordance with a second desired setup, then services the second electronic device 134 in accordance with the second desired setup.

In some embodiments, the first test station 108 also receives a request to service a fifth electronic device (not shown) that is communicatively connected to the first test station 108. In one of such embodiments, both the first electronic device 132 and the fifth electronic device are associated with an identical device model. In such an embodiment, the first test station 108 executes identical instructions used to service the first electronic device 132 to service the fifth electronic device in accordance with the first desired setup. In other embodiments, the first electronic device 132 and the fifth electronic device are associated with different image groups. In such an embodiment, the first test station 108 transmits a request to service the fifth electronic device to the management system 102, and obtains at least one of a third virtual hard drive (not shown) containing a copy of an image of applications compatible with the image group of the fifth electronic device and a location of the third virtual hard drive. The first test station 108 then performs the foregoing process 300 described in the previous paragraphs and illustrated in FIG. 3 or a similar process to determine a desired setup for servicing the fifth electronic device, and services the fifth electronic device in accordance with the desired setup.

Figure 5:
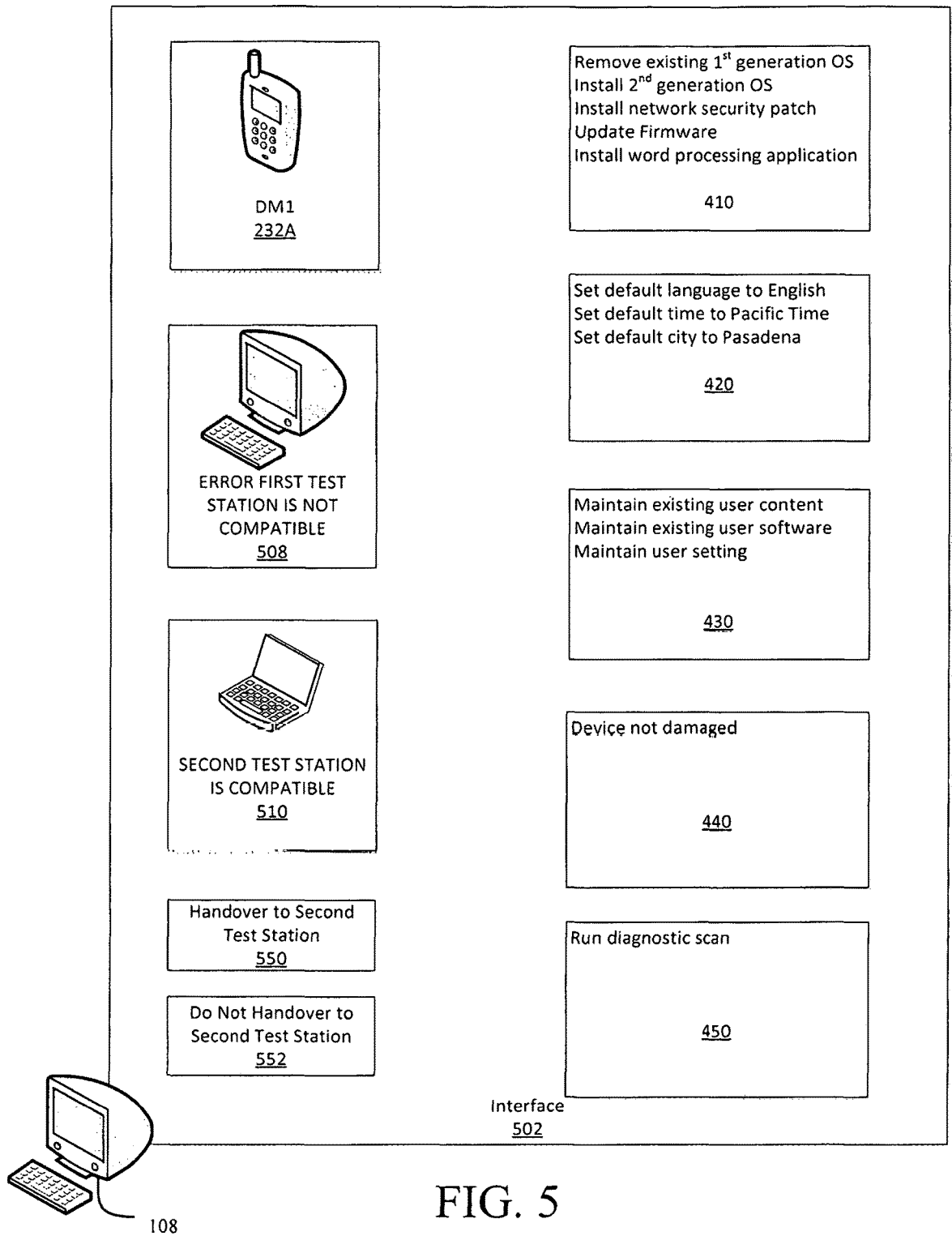
FIG. 5 is a schematic view of a third interface displaying an alternative test station that is operable to service the first electronic device of FIGS. 1A and 1B based on the first desired setup illustrated in FIG. 4 on a display screen of the management station of FIGS. 1A and 1B in accordance with one embodiment.

FIG. 5 is a schematic view of a third interface 502 displaying an alternative test station that is operable to service the first electronic device 132 of FIGS. 1A and 1B based on the configurations illustrated in FIG. 4 on a display screen of the first test station 108 of FIGS. 1A and 1B in accordance with one embodiment. In some embodiments, the first test station 108 does not include or is not communicatively connected to one or more hardware, software and/or firmware components needed to service the first electronic device 132 in accordance with the first desired setup. The first test station 108, upon determining that the first test station 108 is not operable to service the first electronic device 132 in accordance with the first desired setup, provides a first indication 508 on the third interface 502 notifying the technician that the first test station is not operable to service the first electronic device 132. The first test station 108 may also determine whether the second test station 110 or another test station (not shown) has access to the first virtual hard drive 122 or a location of the first virtual hard drive 122, is communicatively connected to the first electronic device 132, and is operable to service the first electronic device 132 in accordance with the first desired setup. The first test station 108, upon determining that the second test station 110 satisfies the foregoing requirements, provides a second indication 510 on the third interface 502 notifying the technician that the second test station 110 may service the first electronic device 132.

The technician may select a first selectable tab 550 to request the second test station 110 to service the first electronic device 132 or select a second selectable tab 552 to not request the second test station 110 to service the first electronic device 132. In one of such embodiments, the first test station 108, upon receipt of an indication to handover servicing of the first electronic device 132 to the second test station 110, requests the second test station 110 to perform the processes described herein to service the first electronic device 132. In another one of such embodiments, the first test station 108, upon receipt of an indication not to handover servicing of the first electronic device 132 to another test station, generates an error message, and provides the error message for display on the third interface 502, thereby notifying the technician that the first electronic device 132 cannot be serviced by any test station communicatively connected to the first electronic device 132.

Although the foregoing operations are performed by the first test station 108, the operations may also be performed by the second test station 110 or another test station (not shown) that is communicatively connected to the management system 102 and one or more electronic devices. Further, the operations may also be performed by the control station 111 of FIG. 1B to remotely service multiple electronic devices that are communicatively connected to different test stations.

Figure 6:
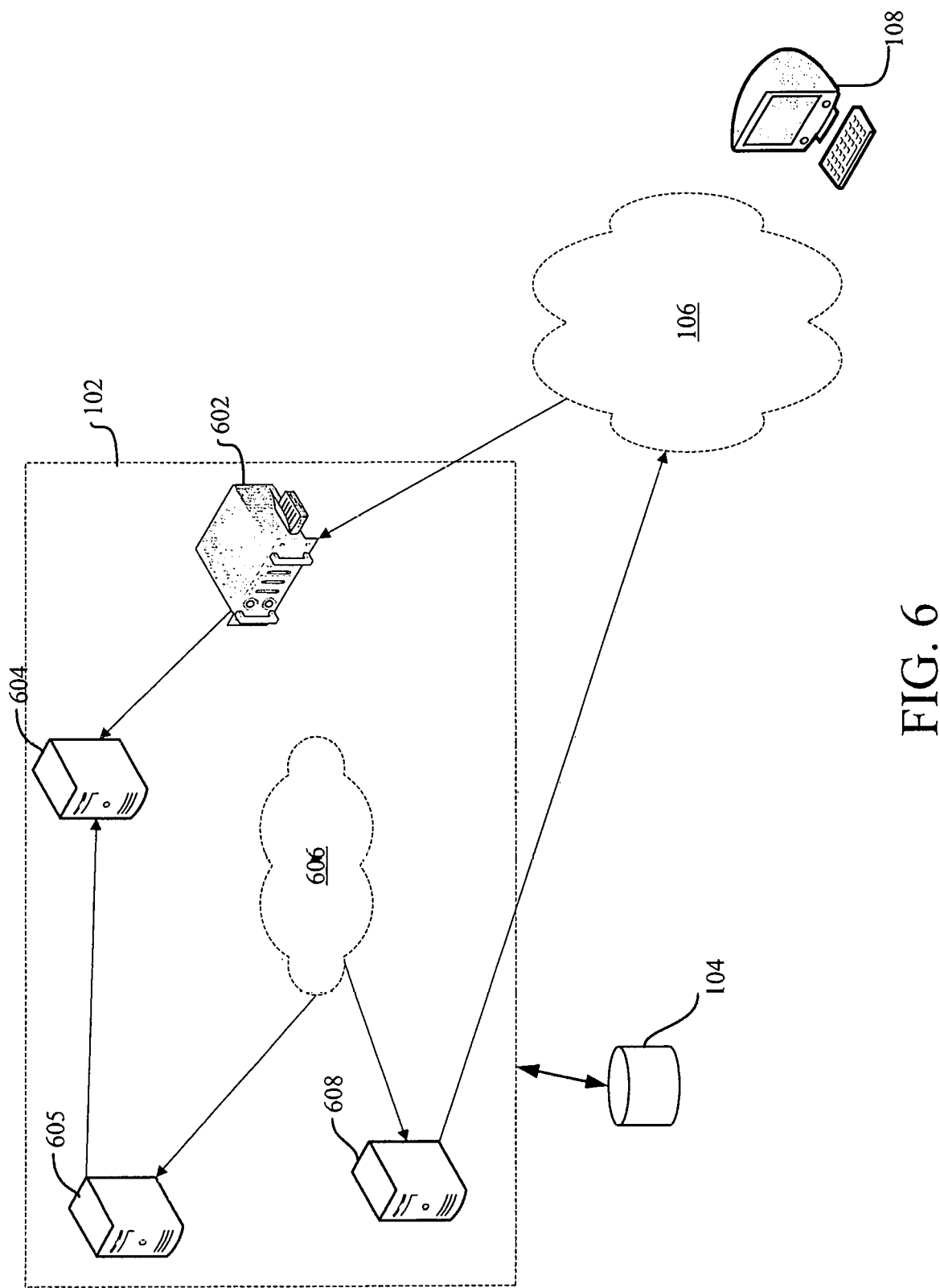
FIG. 6 is a schematic view of different components of the management system of FIGS. 1A and 1B operable to create a virtual hard drive storing a copy of an image of applications for servicing one or the electronic devices of FIGS. 1A and 1B in accordance with one embodiment.

FIG. 6 is a schematic view of different components of the management system 102 of FIG. 1A operable to create a virtual hard drive storing a copy of an image of applications for servicing one or the electronic devices of FIGS. 1A and 1B in accordance with one embodiment. The first test station 108, upon receipt of a request to service the first electronic device 132, transmits the request over the network 106, to a first component 602 of the management system 102 to determine an address of the first test station 108. In one embodiment, the first component 602 of the management system 102 is a Dynamic Host Configuration Protocol (DHCP) server computer operable to obtain the address of the first test station 108 and to provide the address of the first test station 108 to a second component 604 of the management system 102. The second component 604 of the management system 102 is operable to remotely access an operating system to remotely boot from the operating system, and is operable to provide the booted operating system to a third component 605 of the management system 102. In one embodiment, the second component 604 is a Trivial File Transfer Protocol (TFTP) server computer operable to remotely access an operating system compatible with applications executed to service the first electronic device 132.

The third component 605 deploys the booted operating system in an open source network 606 to utilize an open source boot firmware to remotely deploy the booted operating system. In one embodiment, the open source network is an iPreboot eXecution Environment (iPXE) operable to deploy the operating system using iPXE. The deployed operating system accesses the first image 112 stored in the storage medium 104 and creates the first virtual hard drive 122 containing a copy of the first image 112. The first virtual hard drive 122 and/or a location of the first virtual hard drive 122 is then provided to a fourth component 608 of the management system 102, where at least one of the first virtual hard drive 122 and the location of the first virtual hard drive 122 is transmitted to the first test station 108 via the network 106. In one embodiment, the fourth component 608 of the management system is an iSCSI computer operable to obtain the first virtual hard drive 122 and to provide at least one of the first virtual hard drive 122 or a location of the first virtual hard drive 122 via an iSCSI interface of the network 106 to the first test station 108.

Although FIG. 6 illustrates four components and an open source network of the management system 102, the management system 102 may be assembled from a different number of components and networks cumulatively operable to receive a request to service the first electronic device 132, obtain the first virtual hard drive 122, and to provide at least one of the first virtual hard drive 122 and a copy of the first virtual hard drive 122 to the first test station 108 over iSCSI. Alternatively, the management system 102 may be formed from a single work station operable to perform the foregoing processes to provide at least one of the first virtual hard drive 122 and a copy of the first virtual hard drive 122 to the first test station 108 over iSCSI.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to service an electronic device, the method comprising:
   receiving a request to service a first electronic device communicatively connected to a first test station;
   obtaining a device model and an image group of the first electronic device, each image group being associated with one or more different device models;
   determining criteria for servicing the first electronic device in accordance with a first desired setup, the criteria being based on the device model of the first electronic device;
   receiving at least one of a first virtual hard drive having an image of one or more applications compatible with the image group of the first electronic device; and
   executing a first set of the one or more applications to service the first electronic device in accordance with the first desired setup.

2. The computer-implemented method of claim 1, wherein determining the criteria for servicing the first electronic device in accordance with the first desired setup comprises determining at least one of criteria for servicing the first electronic device based on the device model of the first electronic device, a destination of the first electronic device, a device use condition of the first electronic device, a device repair condition of the first electronic device, and a technician specified criterion of the first electronic device.

3. The computer-implemented method of claim 1, further comprising: determining whether the first test station is operable to execute the first set of the one or more applications; and identifying a second test station having access to the first virtual hard drive, wherein the second test station is communicatively connected to the first electronic device and is operable to execute the first set of the one or more applications; and in response to a determination that the first test station is not operable to execute the first set of the one or more applications, requesting the second test station to execute the first set of the one or more applications to service the first electronic device in accordance with the first desired setup.

4. The computer-implemented method of claim 1, further comprising:
   receiving a request to service a second electronic device communicatively connected to the first test station;
   obtaining a device model and an image group of the second electronic device; and
   executing the first set of the one or more applications to service the second electronic device in accordance with the first desired setup if the device model of the first electronic device and the device model of the second electronic device are identical.

5. The computer-implemented method of claim 1, further comprising:
   determining a number of test stations belonging to a first group of test stations, wherein each test station of the first group of test stations is utilized to service at least one electronic device that is associated with a first image group;
   determining a number of virtual hard drives belonging to a first set of virtual hard drives, wherein each virtual hard drive of the first set of virtual hard drives stores a copy of a first image, and wherein the first image is an image of one or more applications utilized to service the at least one electronic device; and
   dynamically requesting the number of the first set of virtual hard drives to be readjusted based on a first ratio, wherein the first ratio is a ratio of the number of test stations belonging to the first group of test stations relative to the number of the first set of virtual hard drives.

6. The computer-implemented method of claim 5, further comprising:
determining a maximum number of the first group of test stations to be concurrently utilized to service the at least one electronic device within a subsequent operational duration,
wherein dynamically requesting the number of the first set of virtual hard drives to be readjusted is further based on the maximum number of the first group test stations to be concurrently utilized to service the at least one electronic device within the subsequent operational duration relative to the number of the first set of virtual hard drives.

7. The computer-implemented method of claim 5, further comprising:
determining a maximum number of the first group of test stations concurrently utilized to service the at least one electronic device during a preceding operational duration,
wherein dynamically requesting the number of the first set of virtual hard drives to be readjusted is further based on the maximum number of the first group of test stations concurrently utilized to service the at least one electronic device during the preceding operational duration relative to the number of the first set of virtual hard drives.

8. The computer-implemented method of claim 5, further comprising:
determining a maximum number of the at least one electronic device to be serviced within an operational duration;
determining a maximum number of the at least one electronic device the first group of test stations are operable to concurrently service; and
dynamically readjusting the number of test stations belonging to the first group of test stations based on a second ratio, the second ratio being a ratio of the maximum number of the at least one electronic device to be serviced within the operational duration relative to the maximum number of the at least one electronic device the first group of test stations are operable to concurrently service.

9. A system for servicing multiple electronic devices, the system comprising
a processor operable to:
receive a request to service a first electronic device communicatively connected to a first test station;
obtain a device model and an image group of the first electronic device, each image group being associated with one or more different device models;
determine criteria for servicing the first electronic device in accordance with a first desired setup, the criteria being based on the device model of the first electronic device;
receive at least one of a first virtual hard drive having an image of one or more applications compatible with the image group of the first electronic device; and
execute a first set of the one or more applications to service the first electronic device in accordance with the first desired setup.

10. The system of claim 9, wherein the processor is further operable to:
determine a number of test stations belonging to a first group of test stations, wherein each test station of the first group of test stations is utilized to service at least one electronic device that is associated with a first image group;
determine a number of virtual hard drives belonging to a first set of virtual hard drives, wherein each virtual hard drive of the first set of virtual hard drives stores a copy of a first image, and wherein the first image is an image of one or more applications utilized to service the at least one electronic device; and
dynamically request the number of the first set of virtual hard drives to be readjusted based on a first ratio, wherein the first ratio is a ratio of the number of test stations belonging to the first group of test stations relative to the number of the first set of virtual hard drives.

11. The system of claim 10, wherein the processor is further operable to:
request at least one existing virtual hard drive of the first set of virtual hard drives to be removed if the first ratio is less than 1; and
request at least one new virtual hard drive of the first set of virtual hard drives to be created if the first ratio is greater than 1.

12. The system of claim 10, wherein the processor is further operable to:
determine a number of test stations belonging to a second group of test stations, wherein each test station of the second group of test stations is utilized to service at least one electronic device that is associated with a second image group;
determine a number of virtual hard drives belonging to a second set of virtual hard drives, wherein each virtual hard drive of the second set of virtual hard drives stores a copy of a second image, and wherein the second image is an image of one or more applications utilized to service the at least one electronic device that is associated with the second image group; and
determine a third ratio, wherein the third ratio is a ratio of the number of test stations belonging to the second group of test stations relative to the number of the second set of virtual hard drives,
wherein the number of the first set of virtual hard drives is readjusted based on the third ratio.

13. The system of claim 12, wherein the processor is further operable to:
request the at least one existing virtual hard drive of the first set of virtual hard drives to be removed if the first ratio and the third ratio are both less than 1 and if the first ratio is less than the third ratio; and
request at least one new virtual hard drive of the first set of virtual hard drives to be created if the first ratio and the third ratio are both less than 1 and if the first ratio is greater than the third ratio.

14. The system of claim 10, wherein the processor is further operable to:
determine a number of electronic devices being serviced by at least one test station and being associated with a second image group;
determine a number of virtual hard drives that store a copy of a second image, wherein the second image is an image of one or more applications compatible with the second image group; and
request at least one virtual hard drive that stores a copy of the second image to be removed if the number of electronic devices being serviced by the at least one test station and being associated with the second image group is less than a first threshold value, and if the number of virtual hard drives that store a copy of the second image is greater than the first threshold value.

15. A non-transitory machine-readable medium comprising instructions stored therein, which when executed by one or more processors, causes the one or more processors to perform operations comprising:
receiving a request to service a first electronic device;
obtaining a device model and an image group of the first electronic device;
determining criteria for servicing the first electronic device in accordance with a first desired setup, the criteria being based on the device model of the first electronic device; and
requesting a first test station to execute a first set of one or more applications compatible with the image group of the first electronic device to service the first electronic device in accordance with the first desired setup,
wherein the first test station is communicatively connected to the first electronic device, and
wherein the first test station is accessible to a first virtual hard drive that stores a copy of an image of the one or more applications.

16. The non-transitory machine-readable medium of claim 15, wherein the instructions, which when executed by one or more processors, cause the one or more processors to perform operations comprising:
determining whether the first test station is operable to execute the first set of the one or more applications; and
identifying a second test station operable to access to the first virtual hard drive,
wherein the second test station is communicatively connected to the first electronic device and is operable to execute the first set of the one or more applications; and
requesting the second test station to execute the first set of the one or more applications to service the first electronic device in accordance with the first desired setup.

17. The non-transitory machine-readable medium of claim 15, wherein the instructions, which when executed by one or more processors, cause the one or more processors to perform operations comprising:
receiving a request to service a second electronic device communicatively connected to the first test station;
obtaining a device model and an image group of the second electronic device;
requesting the first test station to execute the first set of the one or more applications to service the second electronic device in accordance with the first desired setup if the device model of the first electronic device and the device model of the second electronic device are identical;
dynamically obtaining a second desired setup of the second electronic device based on the device model of the second electronic device; and
requesting the first test station to execute a second set of the one or more applications to service the second electronic device in accordance with the second desired setup if the first electronic device and the second electronic device are associated with an identical image group and if the device model of the first electronic device and the device model of the second electronic device are different.

18. The non-transitory machine-readable medium of claim 15, wherein the instructions, which when executed by one or more processors, cause the one or more processors to perform operations comprising:
providing the first desired setup for display prior to requesting the first test station to execute the first set of the one or more applications; and
receiving a user indication confirming the first electronic device should be serviced in accordance with the first desired setup,
wherein the request to service the first electronic device is provided to the first test station after the user indication confirming the first electronic device should be serviced in accordance with the first desired setup is received.

19. The non-transitory machine-readable medium of claim 15, wherein the instructions, which when executed by one or more processors, cause the one or more processors to perform operations comprising:
providing one or more device models of one or more image groups for display on a display interface prior to requesting the first test station to execute the first set of the one or more applications; and
receiving a user selection of the device model of the first electronic device among the one or more device models of the one or more image groups displayed on the display interface,
wherein the device model and image group of the first electronic device are obtained based on the user selection of the device model of the first electronic device.

20. The non-transitory machine-readable medium of claim 15, wherein the instructions, which when executed by one or more processors, cause the one or more processors to perform operations comprising, further comprising:
receiving an updated virtual hard drive storing a updated copy of the image of the one or more applications in response to an update to the image of the one or more applications,
wherein requesting the first test station to execute the first set of the one or more applications comprises requesting the first test station to execute the first set of the one or more applications stored on the updated virtual hard drive to service the first electronic device in accordance with the first desired setup.

* * * * *